(12) United States Patent
Kanokogi et al.

(10) Patent No.: US 6,599,212 B2
(45) Date of Patent: Jul. 29, 2003

(54) BELT FOR CONTINUOUSLY VARIABLE TRANSMISSION

(75) Inventors: Ken Kanokogi, Saitama (JP); Hideaki Yoshida, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/978,769

(22) Filed: Oct. 18, 2001

(65) Prior Publication Data
US 2002/0052261 A1 May 2, 2002

(30) Foreign Application Priority Data
Oct. 19, 2000 (JP) ......................... 2000-318738

(51) Int. Cl.[7] ............................... F16G 1/00
(52) U.S. Cl. ...................... 474/242; 474/201
(58) Field of Search ................. 474/242, 201, 474/244, 245

(56) References Cited

U.S. PATENT DOCUMENTS

| | | | | |
|---|---|---|---|---|
| 3,431,754 A | * | 3/1969 | Steuer | 70/144 |
| 5,004,450 A | * | 4/1991 | Ide | 474/242 |
| 5,123,880 A | * | 6/1992 | Sekine et al. | 474/244 |
| 6,217,472 B1 | * | 4/2001 | Fujioka et al. | 474/242 |
| 6,238,313 B1 | * | 5/2001 | Smeets et al. | 474/244 |
| 6,273,837 B1 | * | 8/2001 | Yoshida et al. | 474/242 |
| 6,293,886 B1 | * | 9/2001 | Ohkawa et al. | 474/242 |
| 6,440,023 B2 | * | 8/2002 | Kanehara et al. | 474/242 |
| 6,440,024 B1 | * | 8/2002 | Kobayashi | 474/242 |

FOREIGN PATENT DOCUMENTS

JP     2000-104793     4/2000

* cited by examiner

*Primary Examiner*—Thomas R. Hannon
*Assistant Examiner*—Bradley J. Van Pelt
(74) *Attorney, Agent, or Firm*—Arent Fox Kintner Plotkin & Kahn, PLLC

(57) ABSTRACT

A V-face of a metal element is prevented from being inclined due to a load from a pulley by increasing the height Hs of an upper non-contact portion of the V-face of the metal element. For example, when the height of the V-face is represented by Hv (mm), and the height of the upper non-contact portion of the V-face is represented by Hs (mm), the height Hv of the V-face and the height Hs of the upper non-contact portion are set so that a relationship $$-0.5265 Hv + 2.768 \leq Hs \leq -0.5934 Hv + 3.524$$

is established.

12 Claims, 10 Drawing Sheets

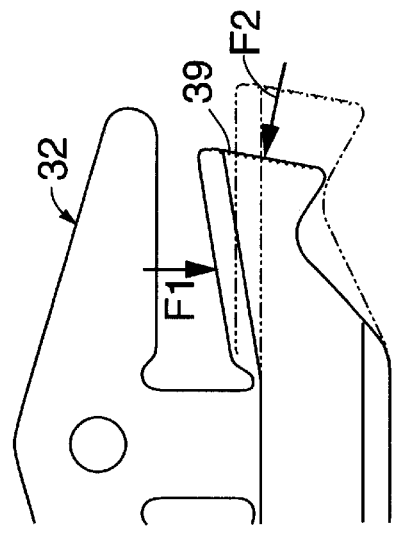
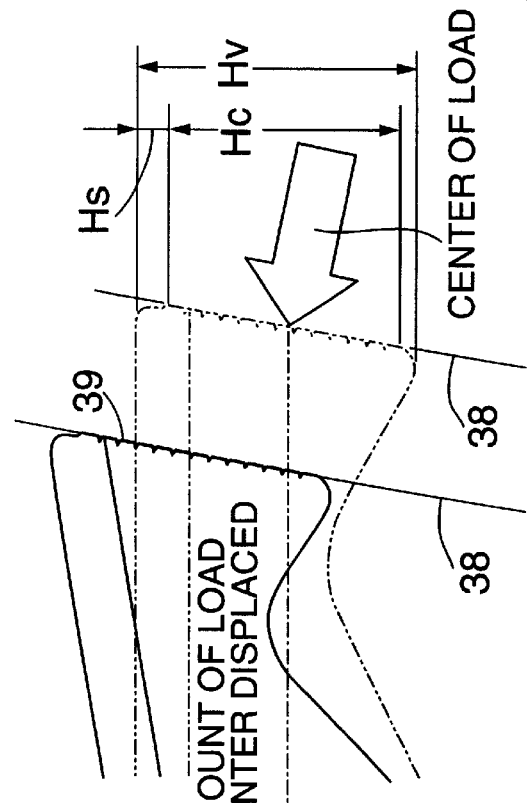
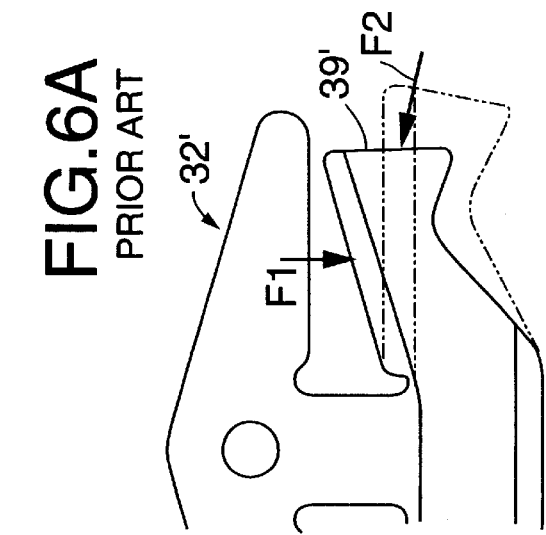
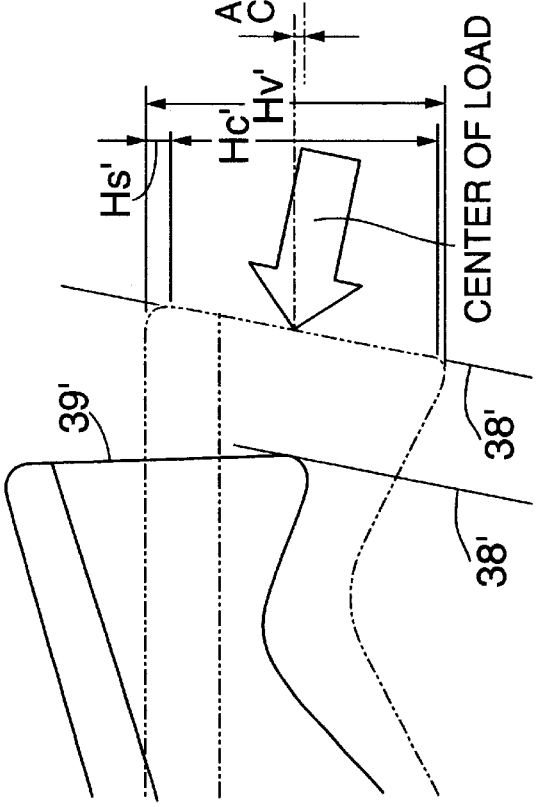

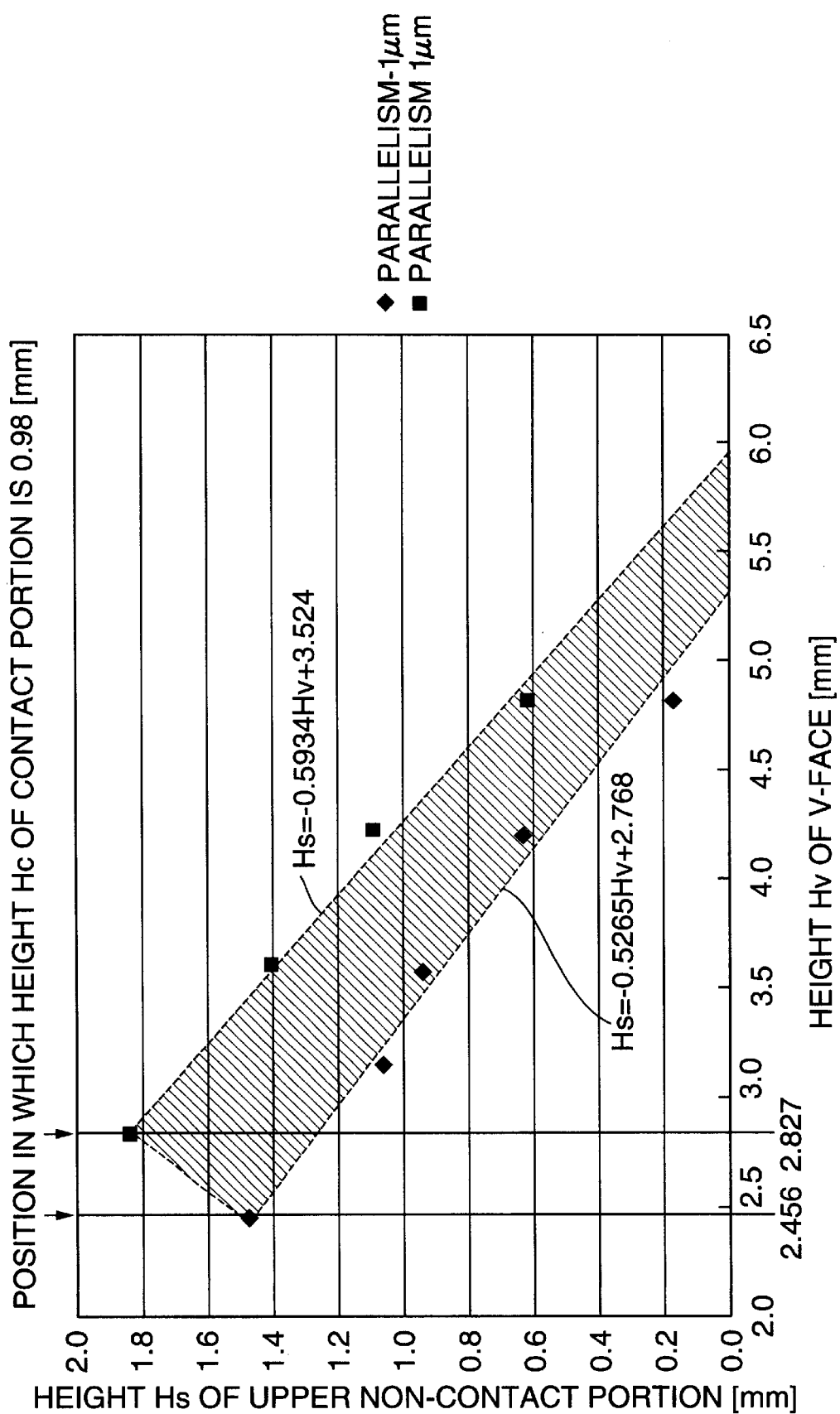

BELT FOR CONTINUOUSLY VARIABLE TRANSMISSION

FIELD OF THE INVENTION

The present invention relates to a belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force.

BACKGROUND OF THE INVENTION

A belt for the continuously variable transmission suffers from the following problem: When left and right V-faces of the metal element receive an axial load from the V-grooves of the pulley, if the V-faces of the metal element are moved in an inclined manner rather than in parallel by the load, one end of the V-face is brought vertically into strong contact with the V-groove and as a result, the other end is lifted from the V-groove of the pulley, whereby an uneven wearing occurs in the metal element and the pulley.

Therefore, the inventor has proposed a belt for a continuously variable transmission in Japanese Patent Application No.2000-10243, in which the V-faces of the metal element receiving the load from the pulley can be moved in parallel by devising the shape of a pair of left and right recesses formed in a lower edge of an element body of the metal element and depressed upwards, thereby solving the above-described problem.

To decrease the pitching moment about a locking edge 41' of a metal element 32' to stabilize the behavior of the metal element 32', it is desirable that the center of the V-face 39' of the metal element 32', i.e., the center of the load, is located at a point as near as possible to the locking edge 41' to shorten a moment arm, as shown in FIG. 10A. Therefore, the metal element 32' shown in FIG. 10C having a smaller V-face height Hv' is convenient for the purpose of locating the center of the load at the point near the locking edge 41', as compared with the metal element 32' having a larger V-face height Hv' shown in FIG. 10B. However, if the V-face height Hv' is decreased, the shape of a recess 46' in the metal element 32' cannot be determined appropriately, and it is difficult to ensure that the sum total of moments applied to the saddle face 44' of the metal element is 0 (zero). As a result, the following problem is encountered: the V-faces 39' of the metal element 32' are moved in the inclined manner rather than in parallel due to the load received from the pulley, and for this reason, an uneven wearing occurs in the metal element 32' and the pulley.

OBJECT AND SUMMARY OF THE INVENTION

The present invention has been accomplished with the above circumstance in view, and it is an object of the present invention to prevent the V-face from being inclined due to the load from the pulley to suppress the uneven wearing of the metal element and the pulley, while decreasing the V-face height of the metal element.

To achieve the above object, according to one embodiment of the present invention, there is provided a belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force. The metal element includes a neck provided between the pair of left and right ring slots, an ear integrally connected to an upper portion of the neck, an element body integrally connected to a lower portion of the neck, a pair of left and right saddle faces formed on an upper surface of the element body to support a lower surface of the metal ring assembly, a pair of left and right V-faces which are formed at laterally opposite ends of the element body and contact the V-groove of the pulleys, and a pair of left and right recesses defined in a lower edge of the element body and depressed upwards. A height Hs of a non-contact portion formed at an upper portion of the V-face and spaced apart from the V-groove is set larger than a height Hs" of a non-contact portion formed at a lower portion of the V-face and spaced apart from the V-groove.

With the above arrangement, the height Hs of the upper non-contact portion of the V-face is set larger than the height Hs" of the lower non-contact portion of the V-face. Therefore, even if the V-face height Hv is decreased to decrease the pitching moment on the metal element due to the load applied to the V-face, the V-face can be prevented from inclination due to the load to decrease the parallelism, thereby preventing the uneven wearing of the V-face of the metal element and the V-groove of the pulley.

According to another embodiment of the present invention, there is provided a belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force. The metal element includes a neck provided between the pair of left and right ring slots, an ear integrally connected to an upper portion of the neck, an element body integrally connected to a lower portion of the neck, a pair of left and right saddle faces formed on an upper surface of the element body to support a lower surface of the metal ring assembly, a pair of left and right V-faces which are formed at laterally opposite ends of the element body and contact the V-groove of the pulleys, and a pair of left and right recesses defined in a lower edge of the element body and depressed upwards. When a height of the V-face is represented by Hv, and a height of a non-contact portion formed at an upper portion of the V-face and spaced apart from the V-groove is represented by Hs, a ratio Hs/Hv is set in a range of $0.149 \leq Hs/Hv \leq 0.258$.

With the above arrangement, the ratio of the height Hs of the upper non-contact portion of the V-face to the height Hv of the V-face is set in the range of $0.149 \leq Hs/Hv \leq 0.258$. Therefore, even if the V-face height Hv is decreased to decrease the pitching moment on the metal element due to the load applied to the V-face, the V-face can be prevented from inclination due to the load to decrease the parallelism, thereby preventing the uneven wearing of the V-face of the metal element and the V-groove of the pulley.

According to another embodiment of the present invention, there is provided a belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force. The metal element includes a neck provided between the pair of left and right ring slots, an ear integrally connected to an upper portion of the neck, an element body integrally connected to a lower portion of the neck, a pair of left and right saddle faces formed on an upper surface of the element body to support a lower surface of the metal ring assembly, a pair of left and right V-faces which are formed at laterally opposite ends of the element body and contact the V-groove of the pulleys, and a pair of left and right recesses defined in a lower edge of the element body and depressed upwards. When a height of the V-face is represented by Hv (mm), and a height of a non-contact portion formed at an upper portion of the V-face and spaced apart from the V-groove is represented by Hs (mm), a relationship, $$-0.5265Hv+2.768 \leq Hs \leq -0.5934Hv +3.524$$

is established.

A skilled artisan would appreciate that, for example, the term "−0.5265 Hv" means −0.5265 multiplied by Hv.

With the above arrangement, the relationship between the V-face height Hv (mm) and the height Hs (mm) of the upper non-contact portion of the V-face satisfies the relationship, $$-0.5265Hv+2.768 \leq Hs \leq -0.5934Hv+3.524.$$

Therefore, even if the V-face height Hv is decreased to decrease the pitching moment on the metal element due to the load applied to the V-face, the V-face can be prevented from inclining due to the load to decrease the parallelism, thereby preventing the uneven wearing of the V-face of the metal element and the V-groove of the pulley.

According to another embodiment of the present invention, a plurality of oil grooves are defined in the V-face.

With the above arrangement, a required amount of oil can be retained between the V-face of the metal element and the V-groove of the pulley, and an extra amount of oil can be discharged promptly, thereby stabilizing the coefficient of friction between the V-face and the V-groove.

BRIEF DESCRIPTION OF DRAWINGS

FIGS. 6A and 6B are diagrams showing the deformation of the metal element due to a load and showing how the present invention compares with the prior art.

FIG. 8 is a graph showing ranges of the height Hv of a V-face and the height Hs of an upper non-contact portion in which the parallelism of the V-face is lower than ±1 μm.

DETAILED DESCRIPTION OF THE EXEMPLARY EMBODIMENTS OF THE INVENTION

The mode for carrying out the present invention will now be described by way of embodiments of the present invention shown in the accompanying drawings.

Figure 1:
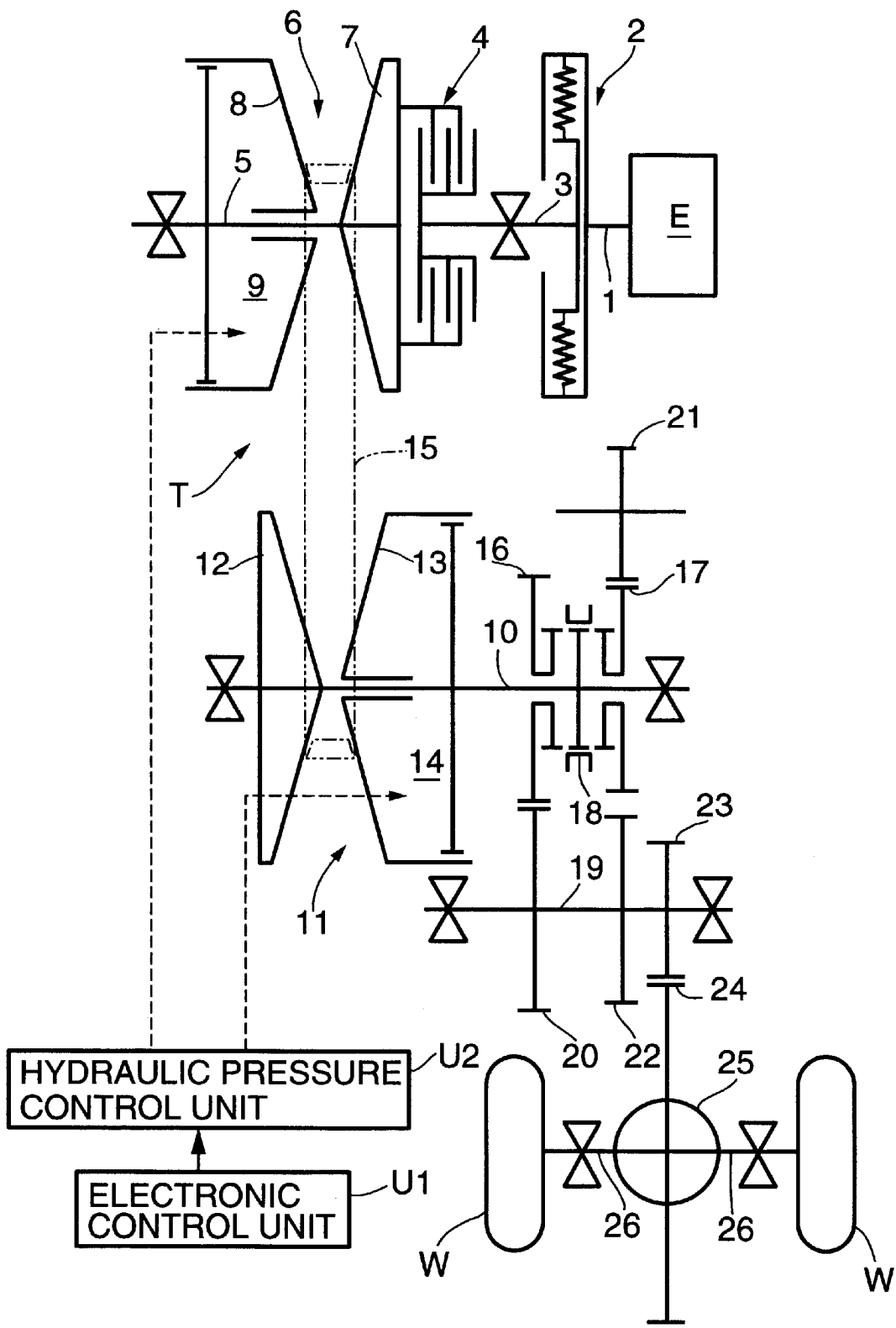
FIG. 1 is a skeletal diagram of a power-transmitting system in a vehicle provided with a continuously variable transmission.
Figure 2:
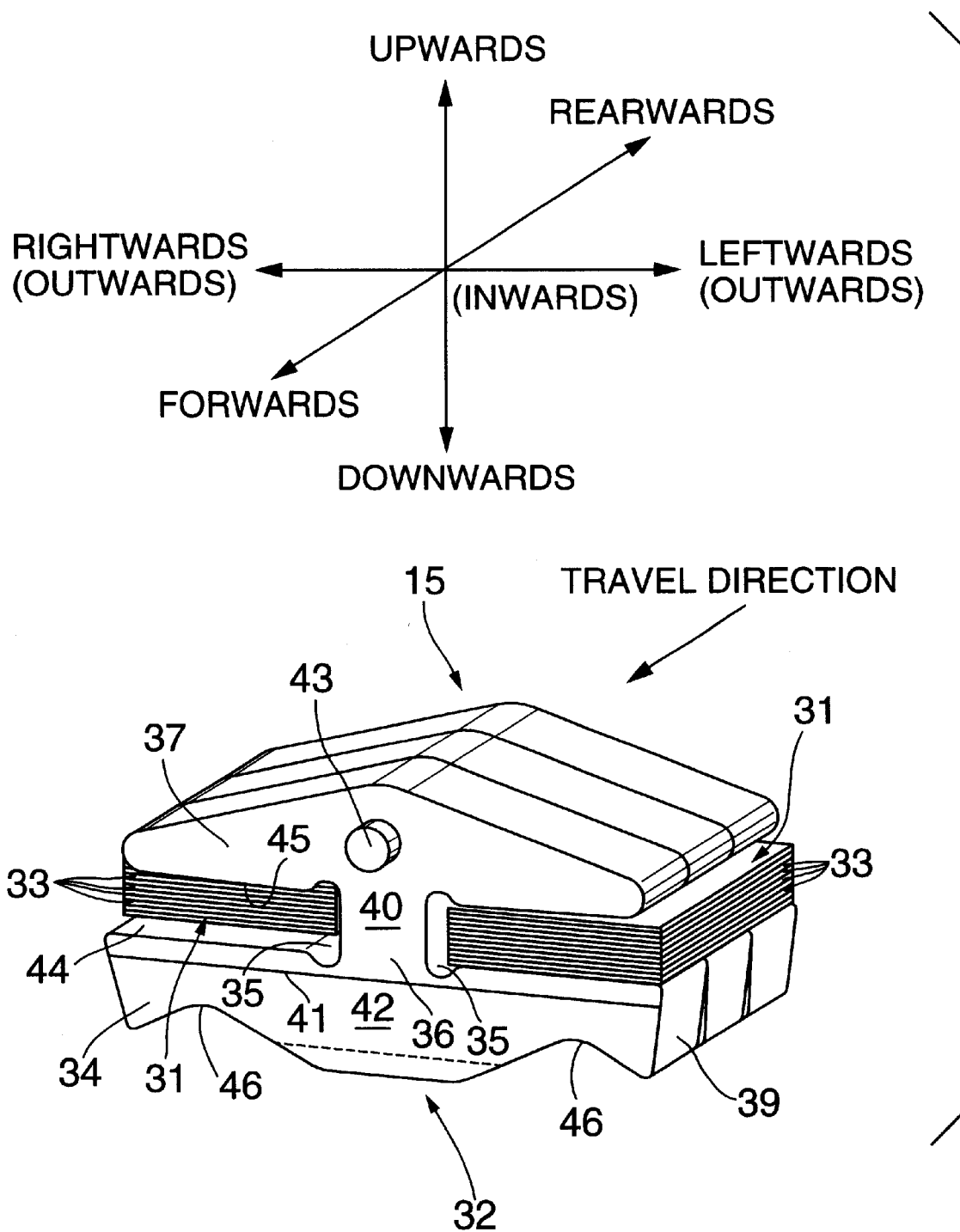
FIG. 2 is a partially perspective view of a metal belt.
Figure 3:
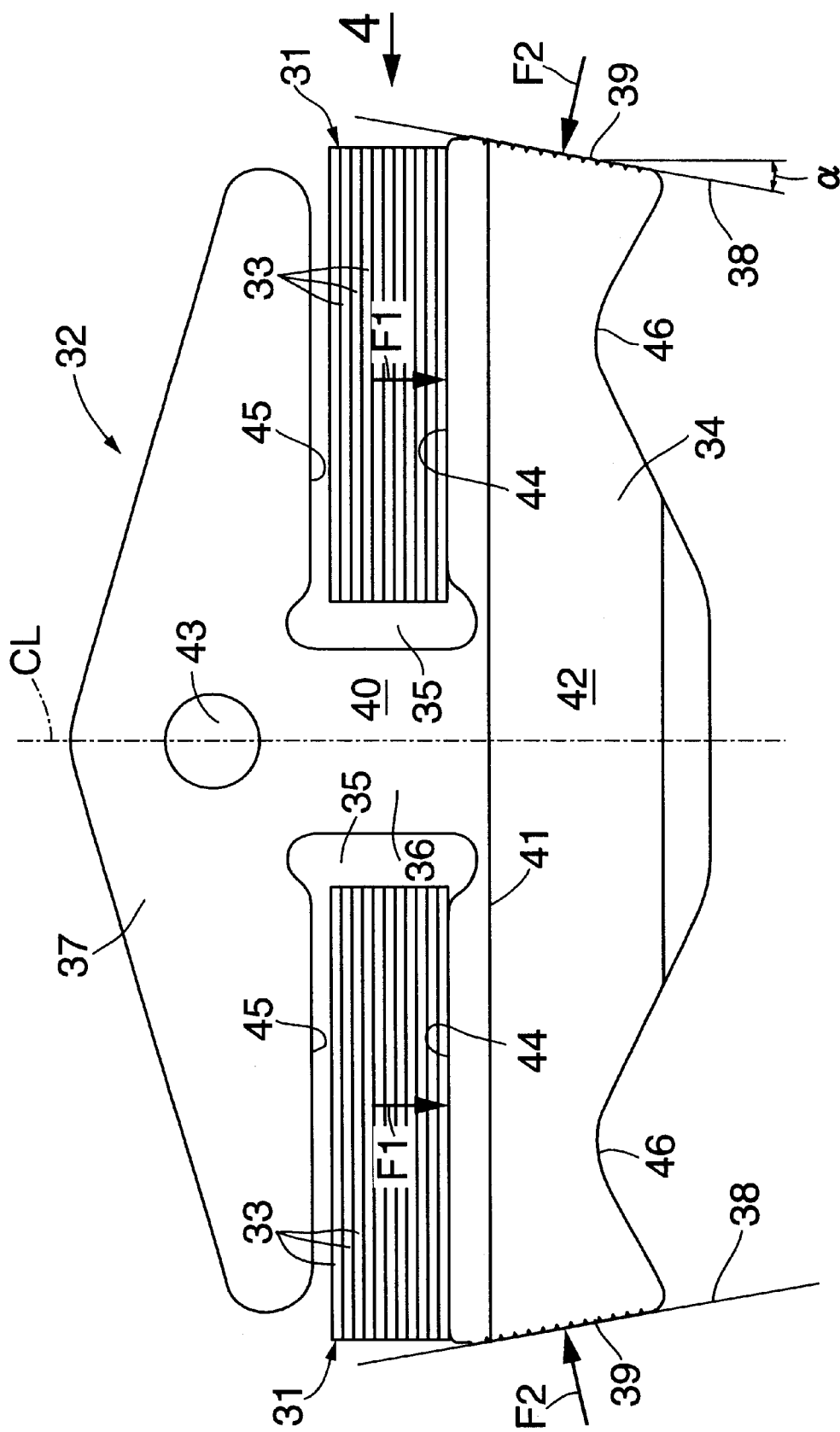
FIG. 3 is a front view of a metal element.
Figure 4:
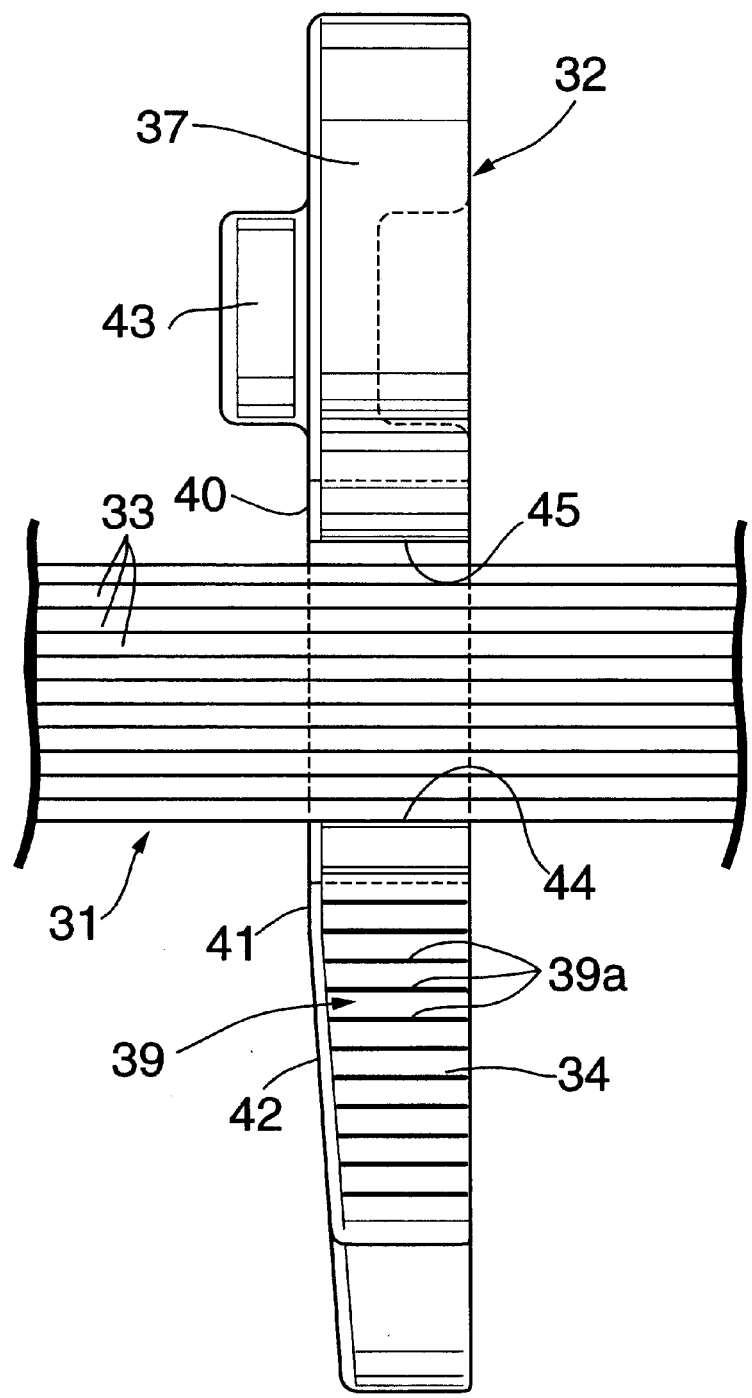
FIG. 4 is a view taken in the direction of an arrow 4 in FIG. 3.
Figure 5:
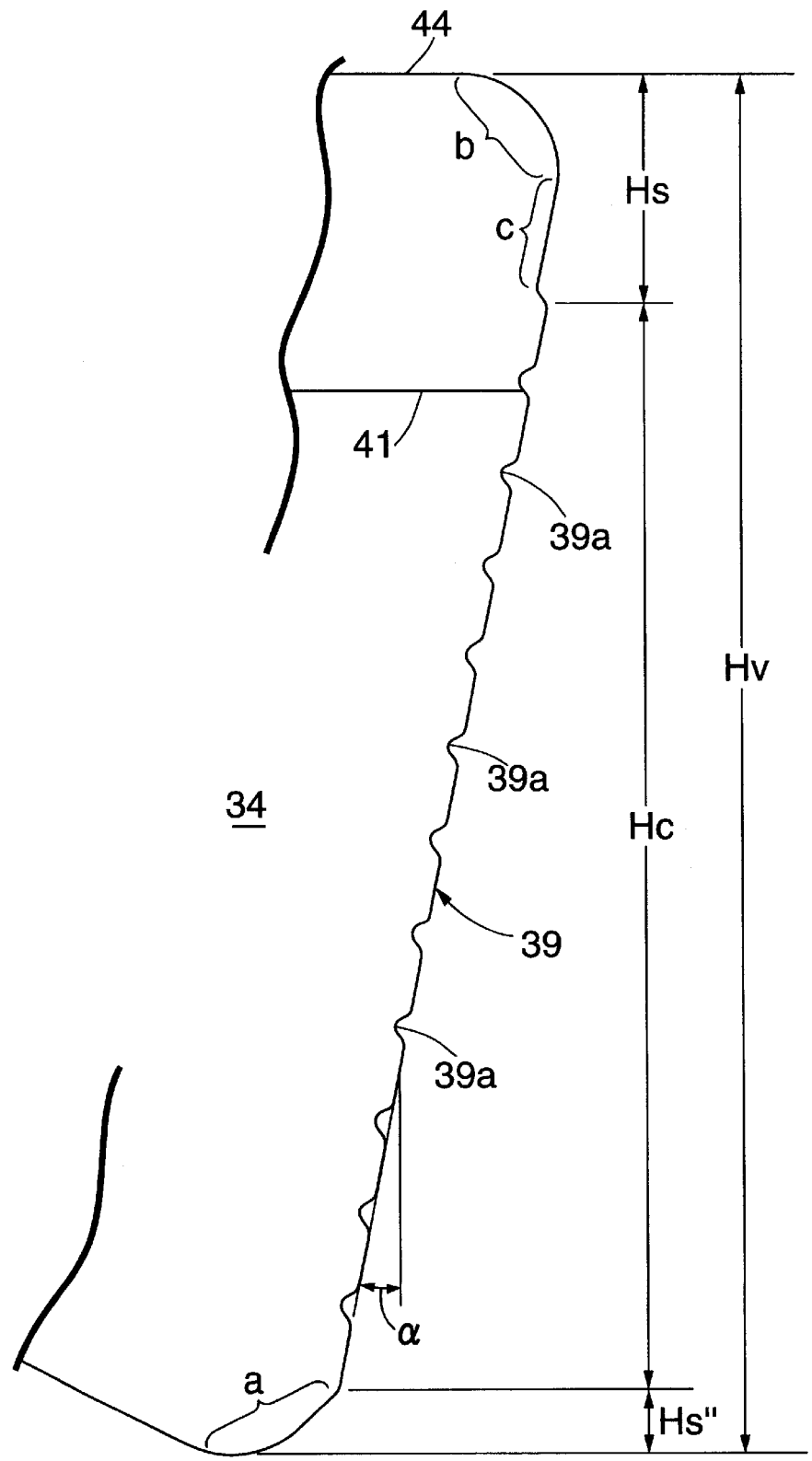
FIG. 5 is an enlarged view of an essential portion shown in FIG. 3.
Figure 9:
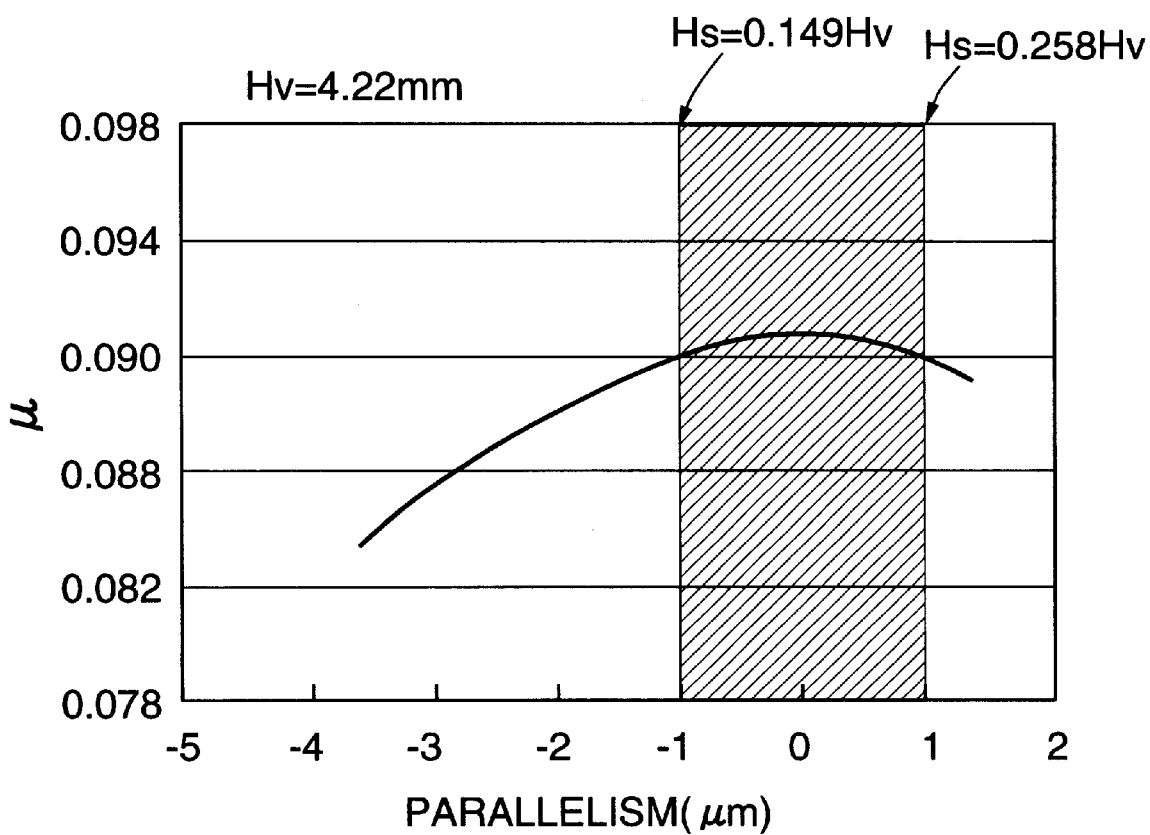
FIG. 9 is a graph showing the relationship between the parallelism of the V-face and a coefficient of friction.
Figure 10A:
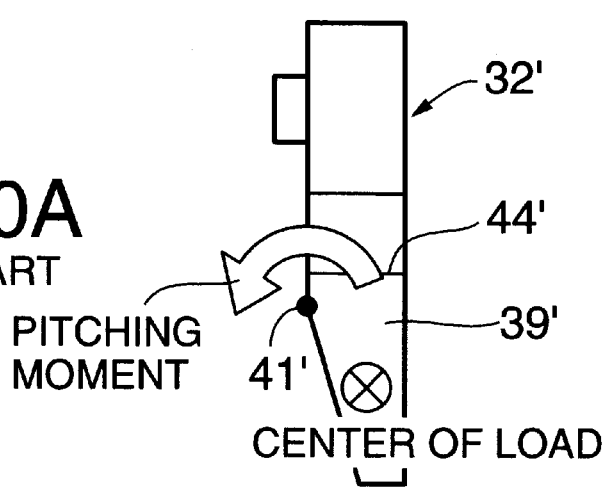
FIGS. 10A, 10B and 10C are diagrams showing the relationship between the height of the center of a load and the pitching moment of a conventional element of a belt for a continuously variable transmission.
Figure 10B:
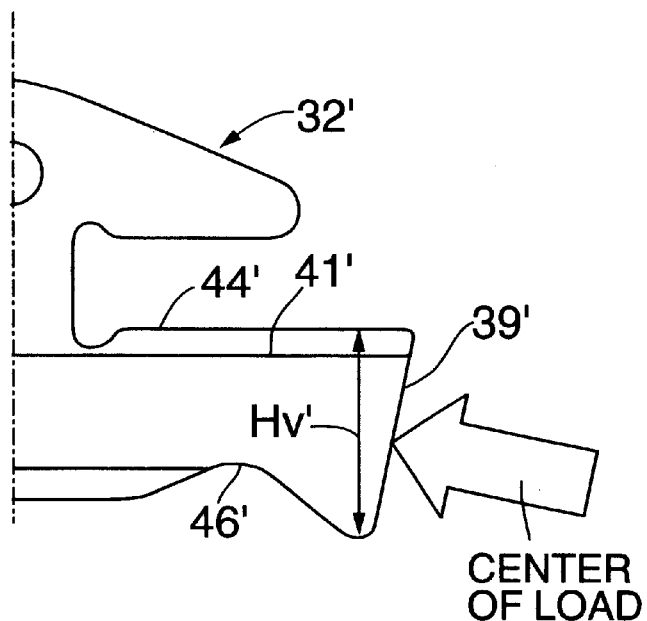
Figure 10C:
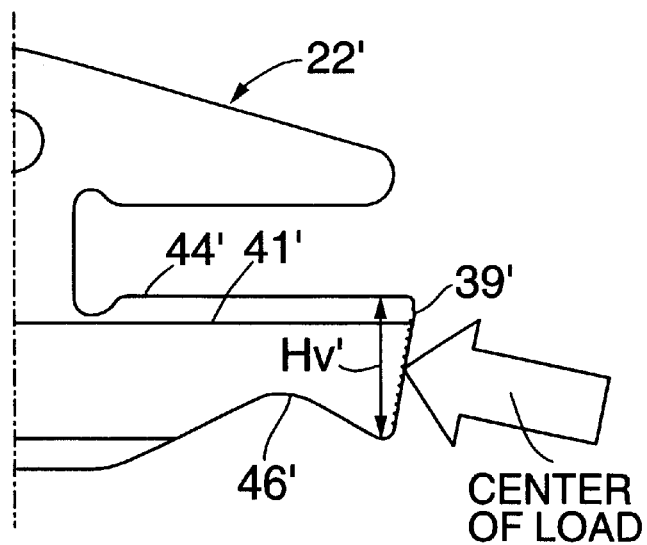

FIGS. 1 to 9 show a first embodiment of the present invention. FIG. 1 is a skeletal diagram of a power-transmitting system in a vehicle provided with a continuously variable transmission; FIG. 2 is a partially perspective view of a metal belt; FIG. 3 is a front view of a metal element; FIG. 4 is a view taken in the direction of an arrow 4 in FIG. 3; FIG. 5 is an enlarged view of an essential portion shown in FIG. 3; FIGS. 6A and 6B are diagrams showing deformation of the metal element due to a load; FIGS. 7A and 7B are diagrams showing the distribution of a bending moment applied to a saddle face; FIG. 8 is a graph showing ranges of the height Hv of a V-face and the height Hs of an upper non-contact portion in which the parallelism of the V-face is lower than ±1 μm; and FIG. 9 is a graph showing the relationship between the parallelism of the V-face and the coefficient of friction.

The definition of forward and backward directions, a lateral direction, a vertical direction and inward and outward directions of a metal element used in the present embodiment is shown in FIG. 2.

FIG. 1 schematically shows the structure of a metal belt type continuous variable transmission T mounted in an automobile. An input shaft 3 connected to a crankshaft 1 of an engine E through a damper 2 is connected to a drive shaft 5 of the metal belt type continuous variable transmission T through a start clutch 4. A drive pulley 6 provided on the drive shaft 5 includes a stationary pulley half 7 secured to the drive shaft 5, and a movable pulley half 8 which can be moved toward and away from the stationary pulley half 7. The movable pulley half 8 is biased toward the stationary pulley half 7 by a hydraulic pressure applied to an oil chamber 9.

A driven pulley 11 is provided on a driven shaft 10 disposed in parallel to the drive shaft 5, and includes a stationary pulley half 12 secured to the driven shaft 10, and a movable pulley half 13 which can be moved toward and away from the stationary pulley half 12. The movable pulley half 13 is biased toward the stationary pulley half 12 by a hydraulic pressure applied to an oil chamber 14. A metal belt 15 is wound around the drive pulley 6 and the driven pulley 11 (see FIG. 2). The metal belt 15 comprises a large number of metal elements 32 supported on a pair of left and right metal ring assemblies 31, 31. Each of the metal ring assemblies 31 comprises 12 metal rings 33 which are laminated one on another.

A forward drive gear 16 and a backward drive gear 17 are relatively rotatably supported on the driven shaft 10. The forward and backward drive gears 16 and 17 can be coupled selectively to the driven shaft 10 by a selector 18. A forward driven gear 20 meshed with the forward drive gear 16 and a backward driven gear 22 meshed with the backward drive gear 17 through a backward idling gear 21 are secured to an output shaft 19 which is disposed in parallel to the driven shaft 10.

The rotation of the output shaft 19 is input to a differential 25 through a final drive gear 23 and a final driven gear 24, and is transmitted therefrom through left and right axles 26, 26 to driven wheels W, W.

A driving force of the engine E is transmitted to the driven shaft 10 through the crankshaft 1, the damper 2, the input shaft 3, the start clutch 4, the drive shaft 5, the drive pulley 6, the metal belt 15 and the driven pulley 11. When a forward travel range is selected, the driving force of the driven shaft 10 is transmitted to the output shaft 19 through the forward drive gear 16 and the forward driven gear 20, thereby allowing the vehicle to travel forwards. When a backward travel range is selected, the driving force of the driven shaft 10 is transmitted to the output shaft 19 through the backward drive gear 17, the backward idling gear 21 and the backward driven gear 22, thereby allowing the vehicle to travel backwards.

At that time, hydraulic pressure applied to the oil chamber 9 of the drive pulley 6 and the oil chamber 14 of the driven pulley 11 of the metal belt type continuous variable transmission T are controlled by a hydraulic pressure control unit U2 which is operated by a command from an electronic control unit U1, thereby adjusting the change gear ratio continuously or in a stepless manner. Specifically, if hydraulic pressure applied to the oil chamber 14 of the driven pulley 11 is increased relative to hydraulic pressure applied to the oil chamber 9 of the drive pulley 6, the groove width of the driven pulley 11 is reduced, leading to an increased effective radius, and correspondingly, the groove width of the drive pulley 6 is increased, leading to a reduced effective radius. Therefore, the change gear ratio of the metal belt type continuous variable transmission T is varied toward "LOW" continuously or in the stepless manner. On the other hand, if the hydraulic pressure applied to the oil chamber 9 of the drive pulley 6 is increased relative to the hydraulic pressure applied to the oil chamber 14 of the driven pulley 11, the groove width of the drive pulley 6 is reduced, leading to an increased effective radius, and correspondingly, the groove width of the driven pulley 11 is increased, leading to a reduced effective radius. Therefore, the change gear ratio of the metal belt type continuous variable transmission T is varied toward "OD" continuously or in the stepless manner.

As shown in FIGS. 2 and 3, a metal element 32 is formed from a metal plate by punching or stamping and includes a substantially trapezoidal element body 34, a neck 36 located between a pair of left and right ring slots 35, 35 into which the metal ring assemblies 31, 31 are fitted, and a substantially triangular ear 37 connected to an upper portion of the element body 34 through the neck 36. The element body 34 is formed, at its laterally opposite ends, with a pair of V-faces 39, 39 (inclination angle α) capable of abutting against V-grooves 38, 38 (inclination angle α) of the drive pulley 6 and the driven pulley 11. The metal element 32 is formed, at its front and rear portions as viewed in the travel direction, with a pair of front and rear main surfaces 40, 40 which are perpendicular to the direction of travel and parallel to each other. An inclined face 42 is formed below the front main surface 40 as viewed in the travel direction with a laterally extending locking edge 41 located therebetween. Further, the ear 37 has projecting and recessed engage portions 43 formed at its front and rear surfaces, respectively, in order to couple the metal elements 32, 32 adjacent to each other in the forward and backward directions. Each lower edge and each upper edge of ring slots 35, 35 is called a saddle face 44 and lower ear face 45, respectively. A lower surface of each metal ring assembly 31 abuts against the respective saddle faces 44, 44. Further, a lower edge of the element body 34 is not straight and has a pair of upwardly depressed recesses 46, 46 provided at laterally opposite sides thereof.

As shown in FIG. 3, when the metal belt 15 has been wound around the drive pulley 6 and the driven pulley 11, downward loads F1, F1 are applied to left and right saddle faces 44, 44 of the metal element 32 by the action of the tensions of the metal ring assemblies 31, 31, and loads F2, F2 are applied to left and right V-faces 39, 39 of the metal element 32 from the V-grooves 38, 38 in the drive pulley 6 or the driven pulley 11. As shown in FIG. 6A, a conventional metal element 32' is deformed by the loads F1, F1 and the loads F2, F2. As a result, the angle of the V-faces 39', 39' is significantly different from an angle a of the V-grooves 38', 38' in the drive pulley 6 or the driven pulley 11. The following problem is encountered: a gouging occurs between the V-faces 39', 39' of the metal element 32' and the V-grooves 38', 38' of the drive pulley 6 or the driven pulley 11 causing abnormal wear. To the contrary, even if the metal element 32 of the present invention is deformed as shown in FIG. 6B, abnormal wear can be prevented, if the angle a of the V-faces 39, 39 of the metal element 32 is moved in parallel 26 to the angle of the V-grooves 38, 38 of the drive pulley 6 or the driven pulley 11.

In a state in which the metal element 32 has been sandwiched between the drive pulley 6 and the driven pulley 11, the loads F1, F1 from the metal ring assemblies 31, 31 are applied the entire regions of the saddle faces 44, 44, and the loads F2, F2 from the V-grooves 38, 38 in the pulley 6 or 11 are applied to the V-faces 39, 39. A variation in angle of the V-faces 39, 39 of the metal element 32 at that time is considered below.

Supposed that flexing angle of saddle face: θ amount of saddle face flexed: w distance from inner end of saddle face: X moment on saddle face: M length of saddle face: L longitudinal elastic modulus: E secondary moment on section: I the following expression is established:

$$\theta \approx \tan \theta = dw/dX \tag{1}$$

because the flexing angle θ of the saddle face is very small. In general, $$d^2w/dX^2 = -M/EI \tag{2}$$

and hence, the above equation (2) is integrated over the entire length of the saddle face 44, thereby providing the following equation:

$$\theta = dw/dX = -(1/E) \int (M/I) dX \tag{3}$$

This equation (3) indicates that a value resulting from the integration of the moment M over the entire length of each of the saddle faces 44, 44 may be zero in order to ensure that the flexing angle θ of the saddle faces 44, 44 of the element body 34 at the outer ends (in a position of X=L) of the saddle faces 44, 44 is zero. In other words, if it is ensured that the value resulting from the integration of the moment M over the entire length of each of the saddle faces 44, 44 is zero, the angle α of the V-faces 39, 39 of the metal element 32 is not varied.

As shown in FIG. 5, an arcuate portion a is formed on the metal element 32 at a lower portion of the V-face 39, so that it is not brought into contact with the V-groove 38 in the drive pulley 6 or the driven pulley 11. An arcuate portion b and a straight portion c are formed on the metal element 32 at an upper portion of the V-face 39, so that they are not brought into contact with the V-groove 38 in the drive pulley 6 or the driven pulley 11. In the present invention, a height from a lower end of the lower arcuate portion a to an upper end of the upper arcuate portion b, namely, the saddle face 44, is defined as a height Hv of the V-face. A sum of heights of the upper arcuate portion b and the straight portion c is defined as a height Hs of an upper non-contact portion. A height of the lower arcuate portion a is defined as a height Hs" of a lower non-contact portion. A height from an upper end of the lower arcuate portion a to a lower end of the straight portion b is defined as a height Hc (=Hv−Hs−Hs") of a contact portion. In the present embodiment shown in FIGS. 5 and 6B, the height Hs of the non-contact portion is smaller than that in the prior art shown in FIG. 6A by a value corresponding to the height of the straight portion c. As a result, the position of the center of a load on the V-face 39 is at a lower level than that in the prior art.

Figure 7B:
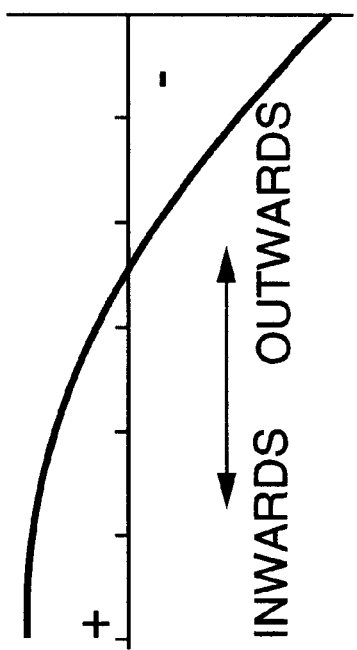
FIGS. 7A and 7B are diagrams showing the distribution of a bending moment applied to a saddle face.
Figure 7A:
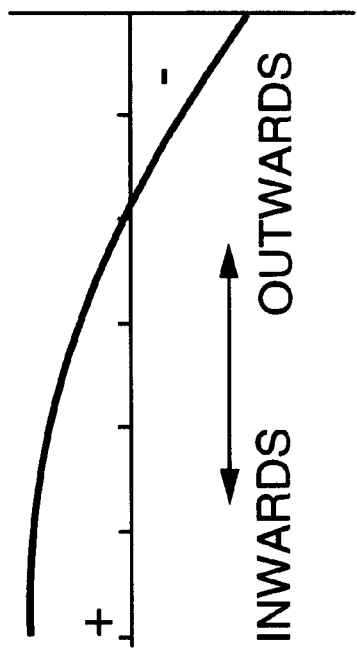

FIGS. 7A and 7B show the distribution of a bending moment applied to the saddle face 44 of the metal element 32. The bending moment assumes a positive value at an inner portion of the saddle face 44, i.e., at a portion adjacent the neck 36, and a negative value at an outer portion of the saddle face, i.e., at a portion adjacent the V-face 39. In the prior art, a point at which the bending moment is 0 (zero) is displaced outwards, as shown in FIG. 7A. Hence, the integration value of the positive bending moment is larger than the integration value of the negative bending moment. On the other hand, in the embodiment of the invention, a point at which the bending moment is 0 (zero) is displaced inwards as shown in FIG. 7B by setting the height Hs of the upper non-contact portion of the V-face 39 larger than the height Hs" of the lower non-contact portion, i.e., by increasing the height Hs of the upper non-contact portion of the V-face 39 to lower the position of the center of the load. Hence, the integration value of the positive bending moment is substantially equal to the integration value of the negative bending moment.

FIG. 8 shows ranges of the height Hv of the V-face of the metal element 32 and the height Hs of the upper non-contact portion by oblique lines, in which the parallelism of the V-face 39 is lower than ±1 μm, when the relationship between the height Hv and the height Hs is varied. Parallelism is defined by a difference between the amount of an upper portion of V-face 39 moved and the amount of the lower portion moved. If the V-face is moved in parallel without being inclined, the parallelism is 0 μm, and if the amount of upper portion of V-face 39 moved is larger than the amount of lower portion moved, as shown in FIG. 6A, the parallelism assumes a negative value.

If the parallelism is equal to −1 μm and constant, then the height Hs of the upper non-contact portion is decreased linearly in accordance with an increase in height Hv of the V-face, and the relationship between the heights Hs and Hv is represented by the following equation:

$$Hs = -0.5265 Hv + 2.768$$

If the parallelism is equal to 1 μm and constant, then the relationship between the heights Hs and Hv is represented by the following equation:

$$Hs = -0.5964 Hv + 3.524$$

The minimum value of the height Hc of the contact portion is required to be 0.98 mm from the restriction of Hertz surface pressure generated at a zone of contact between the V-face 39 and the V-groove 38 of the pulley 6 or 11. Therefore, the minimum value of the height Hv of the V-face at the parallelism equal to −1 μm is 2.456 mm, and the minimum value of the height Hv of the V-face at the parallelism equal to 1 μm is 2.827 mm.

Even if the height of the center of the load is raised to decrease the pitching moment about the locking edge 41 by decreasing the height Hv of the V-face of the metal element 32, the integration value of the bending moment applied to the saddle faces 44, 44 is not zero and, hence, it is difficult to move the V-faces 39, 39 in parallel. However, the V-faces 39, 39 can be moved in parallel against the load from the pulley 6 or 11 by forming the upper non-contact portion having the height Hs in the obliquely-lined range shown in FIG. 8 on each of the V-faces 39, 39. Thus, it is possible to prevent only either of the upper and lower portions of the V-faces 39, 39 of the metal element 32 from being brought into contact with the V-grooves 38, 38 of the pulley 6 or 11, resulting in the promoted wearing, thereby enhancing the durability of the metal element 32, the drive pulley 6 and the driven pulley 11.

FIG. 9 shows the relationship between the parallelism of the V-faces 39, 39 on the metal element 32 having a general V-face height Hv which is 4.22 mm and the coefficient of friction between the metal element 32 and the pulley 6 or 11. In this case, it can be seen that in a range of the height Hs from 0.149 Hv to 0.258 Hv, the parallelism is within ±1, and at that time, the coefficient of friction ensures a large value equal to or larger than 0.090. A required amount of oil can be retained between the V-faces 39, 39 and the V-grooves 38, 38 by a plurality of oil grooves 39a defined in the V-faces 39, 39, and an extra amount of oil can be discharged promptly to contribute to the stability of the coefficient of friction.

Although the embodiment of the present invention has been described, it will be understood that various modifications in design may be made without departing from the subject matter of the present invention.

As discussed above, according to one embodiment of the present invention, the height Hs of the upper non-contact portion of the V-face is set larger than the height Hs" of the lower non-contact portion of the V-face. Therefore, even if the V-face height Hv is decreased to decrease the pitching moment on the metal element due to the load applied to the V-face, the V-face can be prevented from inclination due to the load to decrease the parallelism, thereby preventing the uneven wearing of the V-face of the metal element and the V-groove of the pulley.

According to another embodiment of the present invention, the ratio of the height Hs of the upper non-contact portion of the V-face to the height Hv of the V-face is set in the range of $0.149 \leq Hs/Hv \leq 0.258$. Therefore, even if the V-face height Hv is decreased to decrease the pitching moment on the metal element due to the load applied to the V-face, the V-face can be prevented from inclination due to the load to decrease the parallelism, thereby preventing the uneven wearing of the V-face of the metal element and the V-groove of the pulley.

According to another embodiment of the present invention, the relationship between the V-face height Hv (mm) and the height Hs (mm) of the upper non-contact portion of the V-face satisfies the relationship $$-0.5265 Hv + 2.768 \leq Hs \leq -0.5934 Hv + 3.524.$$

Therefore, even if the V-face height Hv is decreased to decrease the pitching moment on the metal element due to the load applied to the V-face, the V-face can be prevented from inclination due to the load to decrease the parallelism, thereby preventing the uneven wearing of the V-face of the metal element and the V-groove of the pulley.

According to another embodiment of the present invention, the required amount of oil can be retained between the V-face of the metal element and the V-groove of the pulley, and the extra amount of oil can be discharged promptly, thereby stabilizing the coefficient of friction between the V-face and the V-groove.

What is claimed is:

1. A belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force, each metal element comprising:
a neck provided between the pair of left and right ring slots,
an ear integrally connected to an upper portion of the neck,
an element body integrally connected to a lower portion of the neck,
a pair of left and right saddle faces formed on an upper surface of the element body to support a lower surface of the metal ring assembly,
a pair of left and right V-faces formed at laterally opposite ends of the element body and adapted to contact with the V-groove of said pulleys, and
a pair of left and right recesses formed in a lower edge of the element body and depressed upwards,
wherein a height Hs of a non-contact portion formed at an upper portion of the V-face and spaced apart from the V-groove is set larger than a height Hs" of a non-contact portion formed at a lower portion of the V-face and spaced apart from the V-groove, and
wherein the height Hs of the non-contact portion formed at the upper portion of the V-face and spaced apart from the V-groove is set larger than the height Hs" of the non-contact portion formed at the lower portion of the V-face and spaced apart from the V-groove such that the distribution of a bending moment applied to each said saddle face is such that an integration value of a positive bending moment is substantially equal to an integration value of a negative bending moment.

2. A belt for a continuously variable transmission according to claim 1, wherein a plurality of oil grooves are defined in the V-face.

3. A belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force, each metal element comprising:
a neck provided between the pair of left and right ring slots,
an ear integrally connected to an upper portion of the neck,
an element body integrally connected to a lower portion of the neck,
a pair of left and right saddle faces formed on an upper surface of the element body to support a lower surface of the metal ring assembly,
a pair of left and right V-faces formed at laterally opposite ends of the element body and adapted to contact the V-groove of said pulleys, and
a pair of left and right recesses formed in a lower edge of the element body and depressed upwards,
wherein when a height of the V-face is represented by Hv, and a height of a non-contact portion formed at an upper portion of the V-face and spaced apart from the V-groove is represented by Hs, a ratio Hs/Hv is set in a range of $0.149 \leq Hs/Hv \leq 0.258$, and
wherein the height Hs of the non-contact portion formed at the upper portion of the V-face and spaced apart from the V-groove is set larger than the height Hs" of the non-contact portion formed at a lower portion of the V-face and spaced apart from the V-groove such that a distribution of a bending moment applied to each said saddle face is such that an integration value of a positive bending moment is substantially equal to an integration value of a negative bending moment.

4. A belt for a continuously variable transmission according to claim 3, wherein a plurality of oil grooves are defined in the V-face.

5. A belt for a continuously variable transmission, in which a pair of left and right ring slots defined in each of a plurality of metal elements are supported on a pair of left and right metal ring assemblies with each formed of a plurality of endless metal rings laminated one on another, respectively, and which is wound around a drive pulley and a driven pulley to transmit a driving force, each metal element comprising:
a neck provided between the pair of left and right ring slots,
an ear integrally connected to an upper portion of the neck,
an element body integrally connected to a lower portion of the neck,
a pair of left and right saddle faces formed on an upper surface of the element body to support a lower surface of the metal ring assembly,
a pair of left and right V-faces formed at laterally opposite ends of the element body and adapted to contact with the V-groove of said pulleys, and
a pair of left and right recesses formed in a lower edge of the element body and depressed upwards,
wherein when a height of the V-face is represented by Hv (mm), and a height of a non-contact portion formed at an upper portion of the V-face and spaced apart from the V-groove is represented by Hs (mm), a relationship, $$-0.5265Hv + 2.768 \leq Hs \leq -0.5934Hv + 3.524$$

is established, and
wherein the height Hs of the non-contact portion formed at the upper portion of the V-face and spaced apart from the V-groove is set larger than the height Hs" of the non-contact portion formed at a lower portion of the V-face and spaced apart from the V-groove such that a distribution of a bending moment applied to each said saddle face is such that an integration value of a positive bending moment is substantially equal to an integration value of a negative bending moment.

6. A belt for a continuously variable transmission according to claim 5, wherein a plurality of oil grooves are defined in the V-face.

7. A metal element for a belt of a continuously variable transmission, the metal element comprising:
a neck provided between the pair of left and right ring slots,
an ear integrally connected to an upper portion of the neck,
an element body integrally connected to a lower portion of the neck,
a pair of left and right saddle faces formed on an upper surface of the element body to support a lower surface of the metal ring assembly,
a pair of left and right V-faces formed at laterally opposite ends of the element body and adapted to contact with the V-groove of said pulleys, and a pair of left and right recesses formed in a lower edge of the element body and depressed upwards, wherein a height Hs of a non-contact portion formed at an upper portion of the V-face and spaced apart from the V-groove is set larger than a height Hs" of a non-contact portion formed at a lower portion of the V-face and spaced apart from the V-groove, and wherein the height Hs of the non-contact portion formed at the upper portion of the V-face and spaced apart from the V-groove is set larger than the height Hs" of the non-contact portion formed at the lower portion of the V-face and spaced apart from the V-groove such that a distribution of a bending moment applied to each said saddle face is such that an integration value of a positive bending moment is substantially equal to an integration value of a negative bending moment.

8. A belt for a continuously variable transmission according to claim 7, wherein a plurality of oil grooves are defined in the V-face.

9. A metal element for a belt of a continuously variable transmission, the metal element comprising:

a neck provided between the pair of left and right ring slots, an ear integrally connected to an upper portion of the neck, an element body integrally connected to a lower portion of the neck, a pair of left and right saddle faces formed on an upper surface of the element body to support a lower surface of the metal ring assembly, a pair of left and right V-faces formed at laterally opposite ends of the element body and adapted to contact the V-groove of said pulleys, and a pair of left and right recesses formed in a lower edge of the element body and depressed upwards, wherein when a height of the V-face is represented by Hv, and a height of a non-contact portion formed at an upper portion of the V-face and spaced apart from the V-groove is represented by Hs, a ratio Hs/Hv is set in a range of $0.149 \leq Hs/Hv \leq 0.258$, and wherein the height Hs of the non-contact portion formed at the upper portion of the V-face and spaced apart from the V-groove is set larger than the height Hs" of the non-contact portion formed at a lower portion of the V-face and spaced apart from the V-groove such that a distribution of a bending moment applied to each said saddle face is such that an integration value of a positive bending moment is substantially equal to an integration value of a negative bending moment.

10. A belt for a continuously variable transmission according to claim 9, wherein a plurality of oil grooves are defined in the V-face.

11. A metal element for a belt of a continuously variable transmission, the metal element comprising:

a neck provided between the pair of left and right ring slots, an ear integrally connected to an upper portion of the neck, an element body integrally connected to a lower portion of the neck, a pair of left and right saddle faces formed on an upper surface of the element body to support a lower surface of the metal ring assembly, a pair of left and right V-faces formed at laterally opposite ends of the element body and adapted to contact with the V-groove of said pulleys, and a pair of left and right recesses formed in a lower edge of the element body and depressed upwards, wherein when a height of the V-face is represented by Hv (mm), and a height of a non-contact portion formed at an upper portion of the V-face and spaced apart from the V-groove is represented by Hs (mm), a relationship, $$-0.5265Hv+2.768 \leq Hs \leq -0.5934Hv+3.524$$

is established, and wherein the height Hs of the non-contact portion formed at the upper portion of the V-face and spaced apart from the V-groove is set larger than the height Hs" of the non-contact portion formed at a lower portion of the V-face and spaced apart from the V-groove such that a distribution of a bending moment applied to each said saddle face is such that an integration value of a positive bending moment is substantially equal to an integration value of a negative bending moment.

12. A belt for a continuously variable transmission according to claim 11, wherein a plurality of oil grooves are defined in the V-face.

* * * * *